G. SEIFERT.
FLYING MACHINE.
APPLICATION FILED DEC. 31, 1908.
1,014,857.
Patented Jan. 16, 1912.
2 SHEETS—SHEET 2.
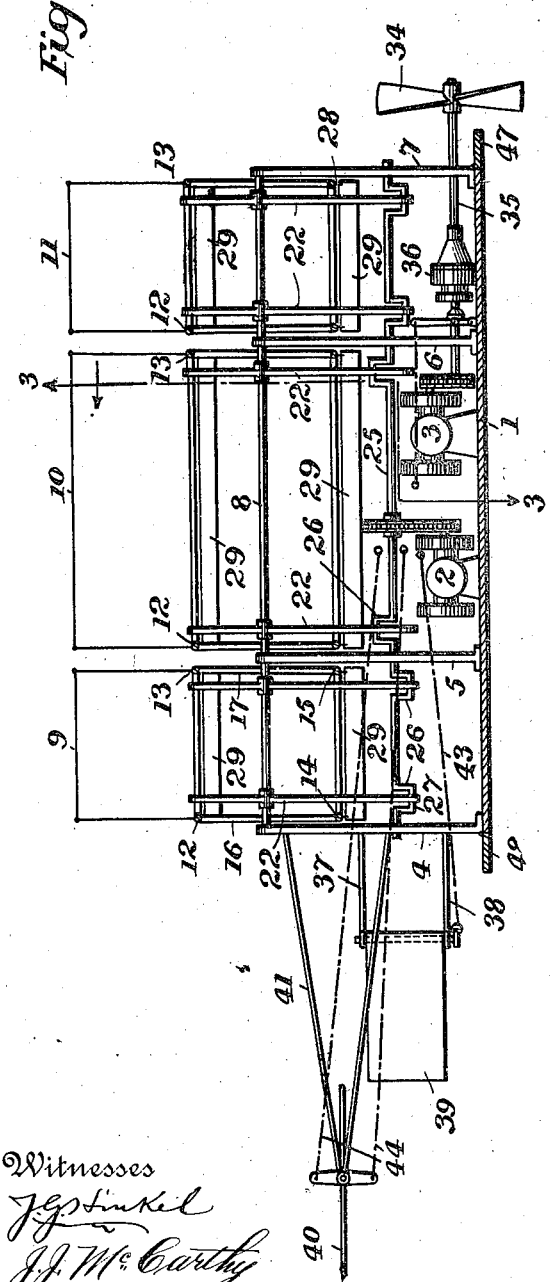
Witnesses
J. G. Hinkel
J. J. McCarthy
Inventor
George Seifert
By
Foster, Freeman, Watson & Coit
Attorneys

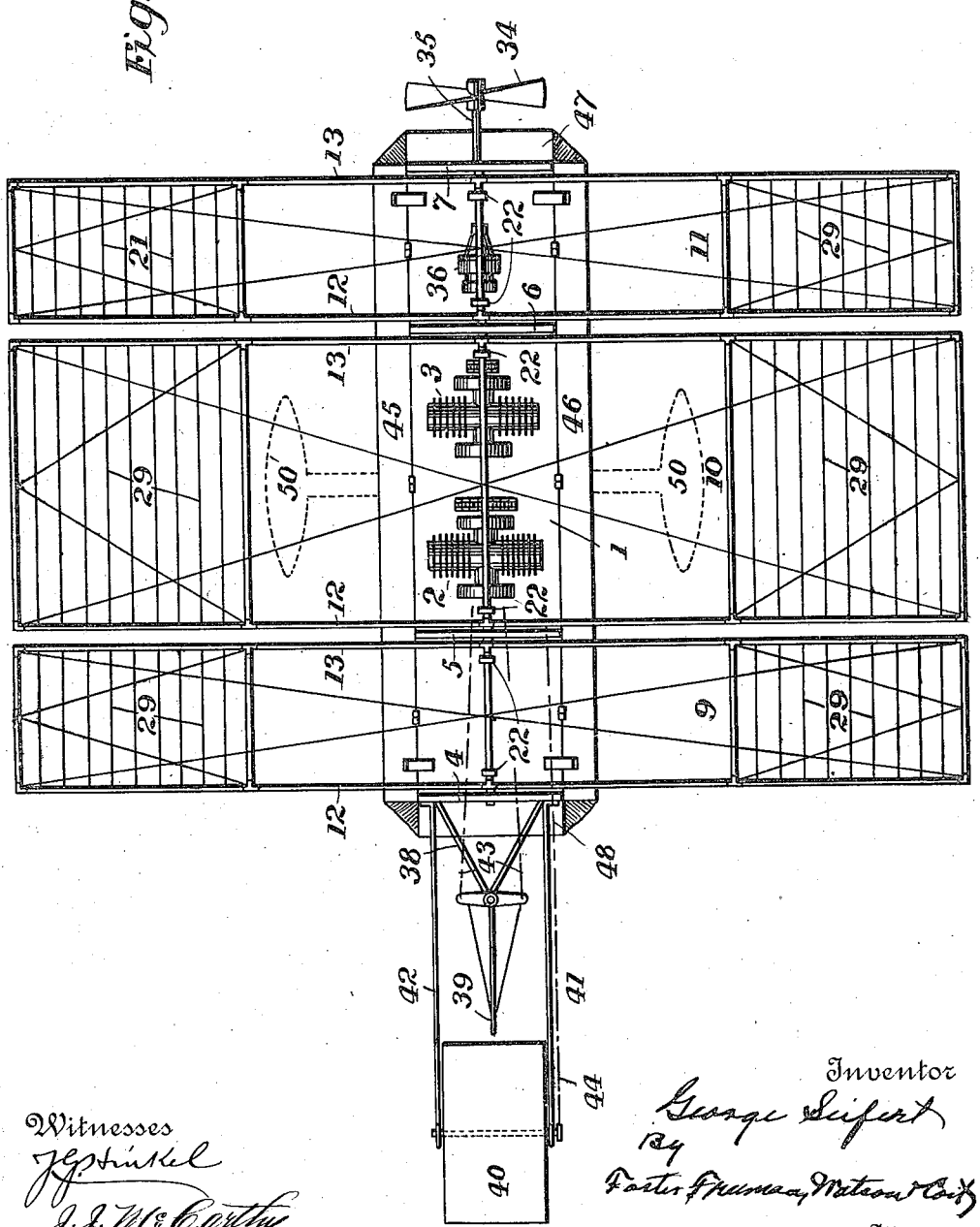

UNITED STATES PATENT OFFICE.

GEORGE SEIFERT, OF NORTHAMPTON, PENNSYLVANIA.

FLYING-MACHINE.

1,014,857.   Specification of Letters Patent.   Patented Jan. 16, 1912.

Application filed December 31, 1908. Serial No. 470,141.

*To all whom it may concern:*

Be it known that I, GEORGE SEIFERT, a subject of the Emperor of Austria-Hungary, residing at Northampton, in the county of Northampton and State of Pennsylvania, have invented certain new and useful Improvements in Flying-Machines, of which the following is a specification.

This invention relates to flying machines of the class which are heavier than air and which are propelled by a motor. Its objects are to produce a machine which can travel fast or slow, or which can be maintained in the air with practically no forward movement.

A further object is to enable the machine to rise from the ground at any point without the use of any special track or starting means, outside of the machine itself.

It also includes means for preventing the machine from sinking in case it comes down in the water.

The novel features will be apparent from the following description taken in connection with the accompanying drawings.

In the drawings:—Figure 1 is a plan view of my flying machine; Fig. 2 is a side view of the machine; and Fig. 3 is a section taken upon the line 3—3 of Fig. 2.

My machine embodies a platform 1 upon which the operator stands, and upon which the motors 2 and 3 for operating the machine are mounted. The platform 1 is comparatively long and narrow and has secured thereto at intervals the vertical supports, 4, 5, 6 and 7. The longitudinal shaft 8 is mounted in the tops of these supports and this shaft furnishes a pivotal support for certain oscillating frames which carry the wings or planes for supporting the machine in the air. There are a series of these frames used, three being shown in the drawings, and it will be understood that any desired number may be used. These frames oscillate upon the shaft 8 and each is provided at its outer end with shutters which automatically close upon downward motion and automatically open upon upward motion, so that the end of the frame which is descending will act as a solid wing or plane to support the machine, while the end which is ascending will not encounter any material resistance in the air. The areas of the frames are so proportioned, and those frames are so arranged that they will balance each other, or in other words so that the area of the closed shutters descending on one side of the machine will be equal to the area of the closed shutters on the opposite side, and those areas will be so arranged in reference to the center of gravity of the machine as not to upset it.

I have lettered the three frames above mentioned 9, 10 and 11, and in this particular form it will be noted that the area of the two frames 9 and 11 equals the area of the single frame 10. Each of these frames is made up of top bars 12 and 13, bottom bars 14 and 15, and vertical connecting bars 16 and 17, thus producing a long frame extending transversely of the machine and being rectangular in cross section. Any suitable number of guy wires 18 may connect various parts of the frame to strengthen them, and I prefer to use guy wires or cords 19 and 20 extending at an angle from the support 21 at the center of the frame. Plates 22 are secured to the frames upon their sides at the center and extend considerably below the bottom of the frame. They are provided with holes 23 to furnish a bearing for supporting the frames from the shaft 8, and they are provided at their lower ends with longitudinal slots 24 for the purpose of oscillating the frames by the means hereafter described.

A longitudinal shaft 25 is mounted in the vertical supports 4, 5, 6 and 7, beneath the shaft 8 and below the bottom edge of the frames, and this shaft 25 is provided with the crank arms 26 having crank pins 27 working in the slot 24 in the lower end of the plate 22. The shaft 25 is rotated by the motor 2 through any suitable connection, and it will be noted that the crank arms connected to operate adjacent frames are arranged 180° apart so that when one frame is being turned in one direction the adjacent frame is being turned in the opposite direction.

Each of the frames 9, 10 and 11 have an upper section 28 carrying thin light shutters 29 loosely hinged to the said section at one edge, and these shutters being placed at such distances apart that when turned up against the section their edges will substantially meet, thus furnishing a substantially continuous wing or plane. It will be understood that the oscillation of the frame will make these shutters swing out slightly and the pressure of the air against them in that part of the frame which is descending will force the shutters up against the frame, thus closing the shutters. The shutters however may be placed at a slight angle to the vertical or may be provided with a slightly bent edge so as to make it certain that all of them will turn in the same direction in closing. These shutters may be made of aluminum, cloth, or any suitable material, and where made of such material that there would be noise in closing, felt or other noise deadening material may be used as stops. The number, size and arrangement of the shutters will be the same upon the opposite ends of the frames, so as to balance them, but it will be understood that any suitable number may be employed and that the length of the frames may vary in accordance with the particular requirements. As shown, the shutters are placed only upon the outer ends of the frames, where there will be the greatest up and down motion. The lower section of each frame is made up of two parts, these parts being hinged at 30, upon the central line of the frame, and being adjustable around that pivot as shown in dotted lines in Fig. 3. These lower sections 31 are adjustably secured to the extensions 32, 33, which form a rigid part of the main frame. The shutters on these lower sections are like those used upon the upper sections and are similarly arranged. Normally, the lower sections will be parallel to the upper sections, but some times it is found desirable to arrange them at an angle to the upper section as shown in Fig. 3, thus securing a different lifting effect.

It will be observed from the above description that while the frames 9 and 11 are turning in one direction, the frame 10 is turning in the opposite direction, thus producing a fanning action directed downwardly by the frames 9 and 11 on one side and the frame 10 on the other side, and this fanning action tends to raise the entire machine vertically, like the flapping of the wings of a bird. The downwardly moving areas being equal upon opposite sides and being symmetrically arranged in reference to the center of the machine, it will not be tipped to one side, but will be moved steadily upward. After the machine has been raised from the ground by the means above indicated, it is desirable to have separate means for propelling it through the air, and for this purpose I use a propeller wheel 34 mounted upon shaft 35 and driven from motor 3. I also provide this shaft 35 with reversing mechanism 36 so that the propeller may be stopped or reversed. In moving forward it is necessary to have some means for guiding the machine, and for this purpose I pivotally mount in the supports 37, 38, the rudder 39 for changing the horizontal direction in which the machine is moved, and I also provide a rudder 40 mounted in the supports 41, 42, for making the machine go up or down. These rudders are controlled by cords 43, 44, which extend back to the place on the platform 1, where the operator stands. These two rudders are on the forward part of the machine. It will be understood that any suitable form of motor may be used for driving my machine, and that instead of having two separate motors for operating the frames and propeller, I may use a single motor for both purposes, by simply providing mechanism whereby the propeller and the frames may be thrown into or out of connection with the motor. It is ordinarily intended that the frames 9, 10 and 11 will oscillate continuously while the machine is in the air, but it will be understood that this is not necessary, since the shutters will automatically close if they are not oscillated, and will then act as an ordinary aeroplane. The continual motion of the frames is desirable because it will keep the machine up in the air without the necessity of rapid forward motion, as is the case with the ordinary aeroplane, and thus my device can be made to go fast or slow, as desired, without sinking to the ground. This makes it easy to control the action of the machine and to make landings wherever desired, and also makes it possible to commence a flight with the machine without having any track or separate starting means.

In addition to the above features of construction I make the platform 1 with hinged sections 45, 46, 47 and 48 at its edges adapted to turn upward at an angle as indicated in dotted lines in Fig. 3. Over the bottom, at the platform, and around the open corners between the sections 45, 46, 47 and 48 I place a flexible water proof material, such as rubber, or water proof canvas, so that when the sections are turned up as described, they form practically a boat which will serve to support the machine in case it descends in the water. The pressure of the water will serve to turn up the edges of the platform, thus forming the boat. Since the frames are so long, extending so far to the sides of the platform it is desirable to have means for steadying the boat, and thus preventing the machine from turning over and sinking. These steadying means I have shown in Fig. 1 in the form of fins 50, 50, which extend laterally from the platform 1. These fins are removable, and are ordinarily carried on top of the platform, but when the machine strikes the water, they are inserted in the eyes 51, 52 on the under surface of the platform, and then occupy the position shown in Fig. 1.

It will be understood that while I have shown a propeller wheel 34 I do not wish to limit myself to that particular form of propelling means, but may use any other suitable form. It will be further understood that the lower sections 31 with their shutters may be omitted if desired, and in that case it is desirable to change the height of the upper section from the platform. This may be done as desired by means of the various holes 23 in plate 22.

Having thus described the invention what is claimed is:

1. In a flying machine, the combination with the platform, of a motor, centrally supported oscillating frames operated by said motor, valved wings carried by said frames on opposite sides of the support, and means for adjusting the vertical angle of said wings in the frames.

2. In a flying machine, the combination with a series of transverse open frames rectangular in cross section the edges of which are in parallel planes, of a pivotal support for said frames at the center, two sets of shutters loosely hinged at one edge across said frames one above the other one set being along the top of said frame, and the other along the bottom, the said shutters being adapted to turn against the frames with adjacent edges meeting.

3. In a flying machine, the combination with a series of transverse open frames rectangular in cross section the edges of which are in parallel planes, of a pivotal support for said frames at the center, two sets of shutters loosely hinged at one edge across said frames one set being along the top of said frame, and the other along the bottom, the said shutters being adapted to turn against the frames with adjacent edges meeting, supports for said shutters on said frames, and means for adjusting the supports for the lower sets of shutters at different angles to the upper set around said pivotal support.

4. In a flying machine, the combination with the platform, of a motor, a centrally supported oscillating frame operated by said motor, the said frame comprising an upper section carrying loosely hinged shutters, and a lower section underneath the upper section carrying loosely hinged shutters, the lower sections upon opposite sides of the central support being adjustable to vary the angle between them and the upper sections.

5. In a flying machine, the combination with the platform, of a motor, a centrally supported oscillating frame operated by said motor, the said frame comprising an upper straight section carrying at its ends loosely hinged depending shutters and a lower section made in two parts, each hinged near the central support and each carrying at its end loosely hinged depending shutters, and means for adjustably connecting the upper and lower sections so as to hold them at different angles to each other.

6. In a flying machine, the combination with a platform, of means thereon for elevating and propelling said machine in the air, sections at the edges of said platform hinged to bend upwardly, waterproof material connecting the edges of said sections, whereby when turned up a water-tight boat-like support will be formed for supporting the machine in the water, and removable laterally extending steadying devices or fins secured to the under surface of the platform.

7. In a flying machine, the combination with the platform and motor, of oscillating frames operated by said motor each frame comprising an upper section carrying shutters adapted to close upon downward motion and to open upon upward motion, a lower section underneath the upper section carrying similar shutters, and means for varying the angular relations of said sections to each other.

8. In a flying machine, the combination with the platform, of a motor, a centrally supported oscillating frame operated by said motor, the said frame on each side of the pivot comprising an upper section carrying shutters adapted to close on downward motion and to open on upward motion, a lower section carrying similar shutters, and means for varying the angular relations of said sections to each other.

In testimony whereof I affix my signature in presence of two witnesses.

GEORGE SEIFERT.

Witnesses:
 FRANCIS R. BAGDON,
 ARTHUR L. BRYANT.